United States Patent
Bank et al.

(10) Patent No.: US 9,978,090 B2
(45) Date of Patent: May 22, 2018

(54) SHOPPING OPTIMIZER

(71) Applicant: GLOBALFOUNDRIES Inc., Grand Cayman (KY)

(72) Inventors: Judith H. Bank, Morrisville, NC (US); Lisa M. Bradley, Cary, NC (US); Michael P. Etgen, Cary, NC (US); Lin Sun, Morrisville, NC (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 1007 days.

(21) Appl. No.: 13/935,762

(22) Filed: Jul. 5, 2013

(65) Prior Publication Data
US 2015/0012380 A1 Jan. 8, 2015

(51) Int. Cl.
*G06Q 30/06* (2012.01)

(52) U.S. Cl.
CPC ..... *G06Q 30/0613* (2013.01); *G06Q 30/0633* (2013.01)

(58) Field of Classification Search
CPC .................................................. G06Q 30/0613
USPC ....................................................... 705/26.8
See application file for complete search history.

(56) References Cited

U.S. PATENT DOCUMENTS

| | | | |
|---|---|---|---|
| 6,334,090 B1 * | 12/2001 | Fujii | G01S 1/047 340/990 |
| 6,842,719 B1 | 1/2005 | Coulter et al. | |
| 7,027,999 B2 | 4/2006 | Smith et al. | |
| 7,263,500 B2 * | 8/2007 | Deal | G06Q 30/0639 705/26.9 |
| 7,945,484 B1 * | 5/2011 | Tam | G06Q 30/06 705/26.1 |
| 8,135,624 B1 * | 3/2012 | Ramalingam | G06Q 20/10 705/26.1 |
| 9,129,332 B1 * | 9/2015 | Oakes, III | G06Q 30/0639 |
| 9,146,116 B1 * | 9/2015 | Champaneria | G01C 21/20 |
| 9,288,242 B2 * | 3/2016 | Van Wie | |
| 9,542,691 B1 * | 1/2017 | Herman | G06Q 30/0226 |
| 2002/0065714 A1 * | 5/2002 | Goodwin, III | G06Q 30/02 705/14.25 |
| 2002/0102993 A1 * | 8/2002 | Hendrey | G06Q 10/00 455/456.3 |

(Continued)

OTHER PUBLICATIONS

Anonymous, "About ROUTE4ME(TM) Route Planner" ROUTE4ME LLC, 2013, pp. 1.

*Primary Examiner* — Alexis Casey
(74) *Attorney, Agent, or Firm* — Heslin Rothenberg Farley & Mesiti P.C.

(57) ABSTRACT

A method, system, and/or computer program product optimizes shopping for one or more desired items. An identification of a desired item, which is initially available for purchase at a first physical store, is received. An identity of a second shopper, who also wants the desired item and is currently shopping for the desired item, is received. One or more processors then determine a likelihood of the first shopper arriving at the first physical store before the second shopper purchases a last available instance of the desired item in the first physical store. In response to determining that the first shopper will arrive at the first physical store before the last available instance of the desired item has been purchased by the second shopper, the first shopper is provided with an identity of the first physical store.

18 Claims, 5 Drawing Sheets

(56) References Cited

U.S. PATENT DOCUMENTS

| | | | | |
|---|---|---|---|---|
| 2002/0143655 A1* | 10/2002 | Elston | G06Q 20/02 | |
| | | | 705/26.81 | |
| 2002/0174021 A1* | 11/2002 | Chu | G06Q 10/063 | |
| | | | 705/7.11 | |
| 2002/0178013 A1* | 11/2002 | Hoffman | G06Q 30/0601 | |
| | | | 705/1.1 | |
| 2003/0158796 A1* | 8/2003 | Balent | G06Q 30/0633 | |
| | | | 705/28 | |
| 2004/0068459 A1 | 4/2004 | Avery et al. | | |
| 2004/0104930 A1* | 6/2004 | Stoler | G06Q 30/02 | |
| | | | 715/738 | |
| 2004/0186783 A1 | 9/2004 | Knight et al. | | |
| 2004/0217166 A1* | 11/2004 | Myers | G06Q 20/343 | |
| | | | 235/383 | |
| 2005/0097005 A1* | 5/2005 | Fargo | G06Q 30/00 | |
| | | | 705/26.62 | |
| 2005/0216349 A1 | 9/2005 | Vaseloff et al. | | |
| 2006/0271552 A1* | 11/2006 | McChesney | G06Q 30/02 | |
| 2007/0118430 A1* | 5/2007 | Wiseman | G06F 17/3087 | |
| | | | 705/26.62 | |
| 2007/0150369 A1* | 6/2007 | Zivin | G06Q 30/02 | |
| | | | 705/26.64 | |
| 2007/0150379 A1 | 6/2007 | Francis et al. | | |
| 2007/0191026 A1* | 8/2007 | Teplitsky | G01C 21/20 | |
| | | | 455/456.3 | |
| 2008/0005104 A1* | 1/2008 | Flake | G06F 17/3087 | |
| 2008/0154720 A1 | 6/2008 | Gounares et al. | | |
| 2009/0157518 A1* | 6/2009 | Bishop | G06Q 20/02 | |
| | | | 705/19 | |
| 2010/0162149 A1* | 6/2010 | Sheleheda | A63F 13/12 | |
| | | | 715/764 | |
| 2010/0332315 A1* | 12/2010 | Kamar | G06Q 30/02 | |
| | | | 705/14.46 | |
| 2011/0029364 A1* | 2/2011 | Roeding | G06Q 30/00 | |
| | | | 705/14.16 | |
| 2011/0153495 A1* | 6/2011 | Dixon | G06Q 20/10 | |
| | | | 705/39 | |
| 2012/0130796 A1* | 5/2012 | Busch | G06Q 30/02 | |
| | | | 705/14.36 | |
| 2012/0191566 A1* | 7/2012 | Sayan | G06Q 30/0601 | |
| | | | 705/26.8 | |
| 2012/0290375 A1* | 11/2012 | Truong | G06Q 30/0226 | |
| | | | 705/14.17 | |
| 2013/0030955 A1 | 1/2013 | David | | |
| 2015/0073906 A1* | 3/2015 | Chauhan | G06Q 30/0261 | |
| | | | 705/14.58 | |
| 2016/0196596 A1* | 7/2016 | Van Wie | H04N 7/157 | |
| | | | 705/26.41 | |

\* cited by examiner

SHOPPING OPTIMIZER

BACKGROUND

The present disclosure relates to the field of computers, and specifically to the use of computers for optimizing shopping efficiency. Still more particularly, the present disclosure relates to aiding a shopper in maximizing purchases of limited quantity items.

There are certain days of the year when almost every store has a big sale with special limited quantity or 'early bird' items. This often happens the day after Thanksgiving (called Black Friday), Columbus Day, the day after Christmas, New Year's day, Veterans Day, etc. Stores open early and shoppers line up hours beforehand. Some shoppers start lining up to enter the store the night before the event. Stores advertise these items several days in advance in colorful flyers and catalogs. Many of the flyers are available on the Internet before the printed copies are distributed.

SUMMARY

A method, system, and/or computer program product optimizes shopping for one or more desired items. An identification of a desired item, which is initially available for purchase at a first physical store, is received. An identity of a second shopper, who also wants the desired item and is currently shopping for the desired item, is received. One or more processors then determine a likelihood of the first shopper arriving at the first physical store before the second shopper purchases a last available instance of the desired item in the first physical store. In response to determining that the first shopper will arrive at the first physical store before the last available instance of the desired item has been purchased by the second shopper, the first shopper is provided with an identity of the first physical store.

DETAILED DESCRIPTION

Figure 1:
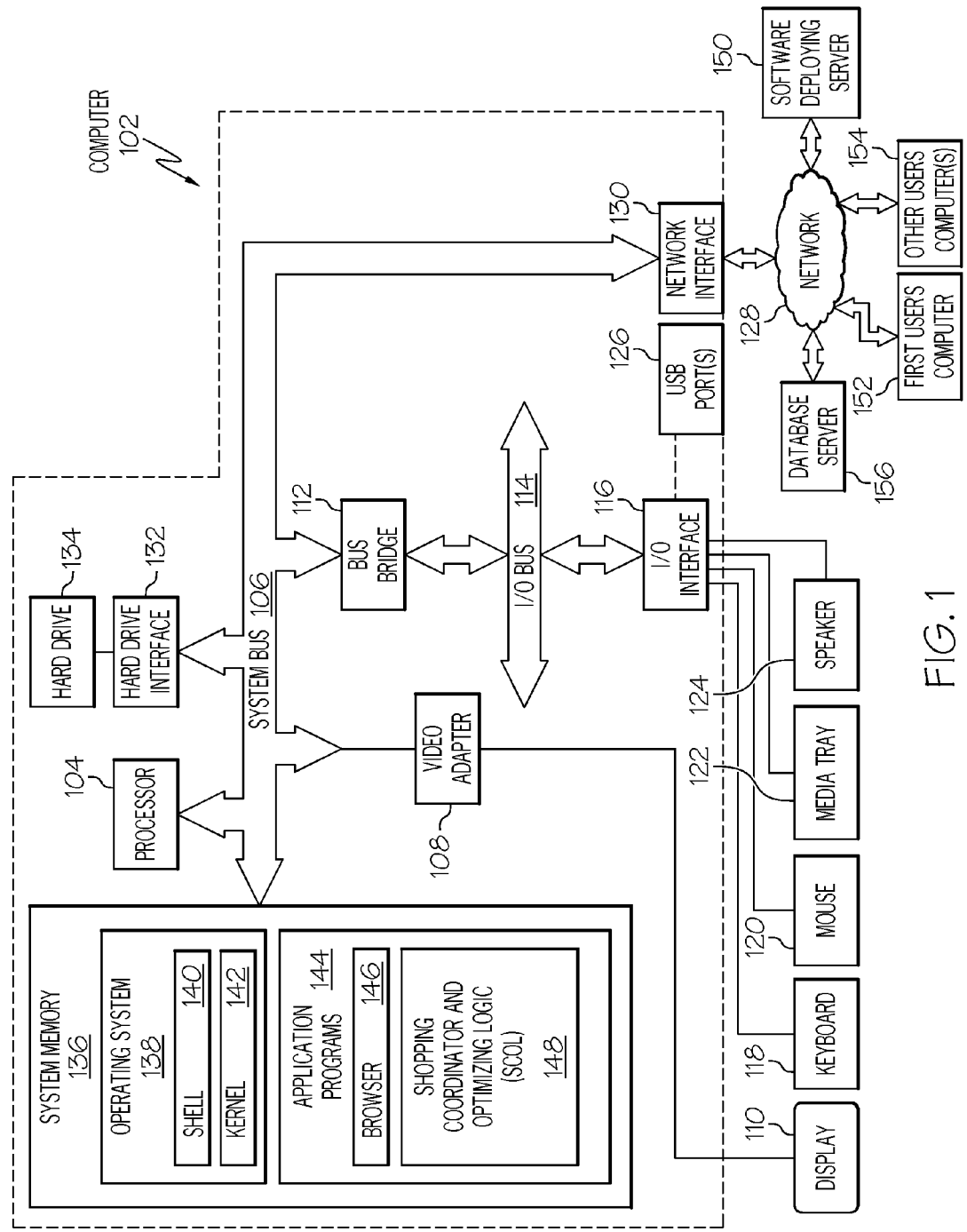
FIG. 1 depicts an exemplary system and network which may be used to implement the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or first user's computer 152, other users' computer(s) 154, and/or database server 156.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a speaker 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems such as first user's computer 152, other users' computer(s) 154, and/or database server 156.

Application programs 144 in computer 102's system memory (as well as software deploying server 150's system memory) also include a shopping coordinator and optimizing logic (SCOL) 148. SCOL 148 includes code for implementing the processes described below, including those described and/or referenced in FIGS. 2-5. In one embodiment, computer 102 is able to download SCOL 148 from software deploying server 150, including in an on-demand basis, wherein the code in SCOL 148 is not downloaded until needed for execution. Note further that, in one embodiment of the present invention, software deploying server 150 performs all of the functions associated with the present invention (including execution of SCOL 148), thus freeing computer 102 from having to use its own internal computing resources to execute SCOL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
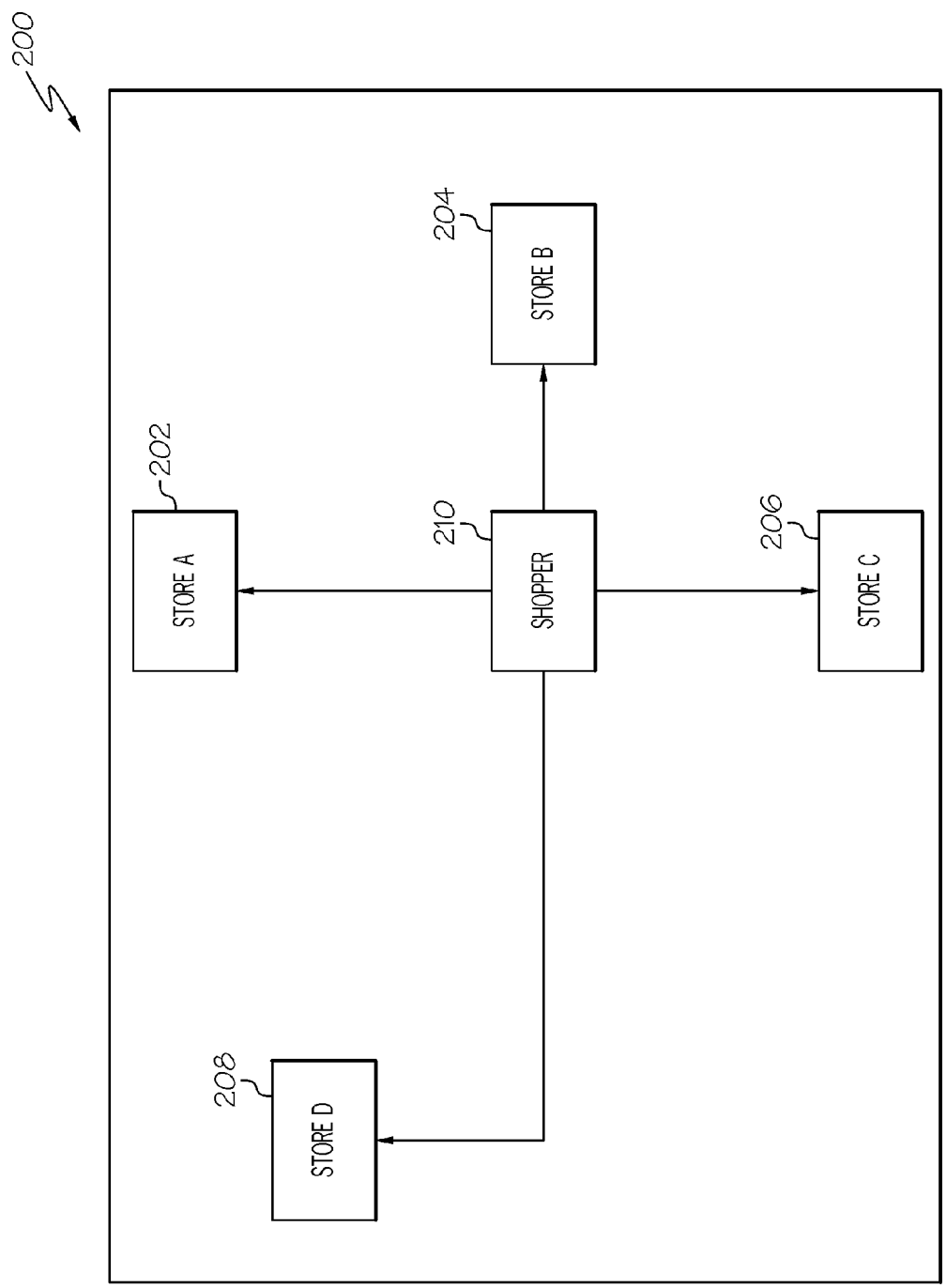
FIG. 2 depicts a map of a shopper and relative distances to various stores that have a desired item for sale.

With reference now to FIG. 2, consider map 200, which depicts physical stores A-D (element 202, 204, 206, and 208) and their physical distance (i.e., the distance that must be traversed on public roads) and/or temporal distance (i.e., "travel time") to a current position of a shopper 210. The current position of shopper 210 may be a fixed location, such as shopper 210's home, hotel, or place of business, or it may be a mobile location, such as a motor vehicle in which the shopper 210 is riding, or it may be a pedestrian location of the shopper 210. Assume that one or more of the stores A-D have one or more desired items that the shopper 210 wants to purchase. However, these desired items are 1) in a limited quantity, and/or 2) are offered at a special price for a highly limited time period (e.g., only from 4:00 AM to 5:00 AM on the day after Thanksgiving). The present invention enables shopper 210 to receive a shopping itinerary that provides a greatest likelihood of purchasing one or more desired items (e.g., from a list created by the shopper 210) before they sell out. Various embodiments of the present invention also enable the shopper to find the best prices for the desired items; to locate any available alternative products if the desired items sell out before the shopper can get to them; and/or to identify the best route to the physical store locations that have the desired items (or their equivalent) in stock.

Thus, one or more embodiments of the present invention address the needs of a shopper who wants to buy special items from each of multiple stores. Without the present invention it is difficult for the shopper to determine which order to visit the stores, in order to be able to purchase the largest number and quantity of desired items before they are all gone (i.e., purchased by other shoppers) or to save the most money by purchasing the items with the largest savings. As described herein, in one embodiment the present invention allows the system and/or retailer to suggest substitute items at the same or similar price.

In one embodiment of the present invention, a shopper reviews one or more on line store advertising flyers prior to a sale and selects (marks) items he/she would like to purchase. The shopping optimizer (i.e., the hardware and software described herein) then plans an optimized shopping trip containing recommended arrival times at one or more of the stores. In one embodiment, the shopping plan (i.e., shopping itinerary) is updated dynamically during the day of a one-day sale to maximize the total number and quantity of desired items that can be purchased before supplies run out (or alternately, to optimize the dollar savings for purchasing the desired items before supplies are exhausted).

In one embodiment, the present invention coordinates inventory tracking of selected items at different stores with the user's GPS location and the user's historical expected travel times and risk tolerance for finding inventory. In one embodiment, travel times of other en route shoppers are also utilized in order to recommend a shopping plan that maximizes the number of acquired items or maximizes cost savings for the shopping trip. In one embodiment, the shopping trip plan of a user (i.e., the first shopper) is dynamically updated each time the user changes locations (e.g., when the user completes his shopping at one store and is ready to travel to the next one) and/or each time the other shoppers change locations. In one embodiment, if supply of a selected item is predicted to be exhausted, the present invention (i.e., shopping optimizer) communicates with a retailer and allows him to suggest a substitute item.

In one embodiment, a Web based service available to multiple users maintains a view of all known users simultaneously competing for the same items in the same retail locations at the same time.

In one embodiment, a user of the present invention uses an application, browser plug-in or other software program executing on a computing device (e.g., a smart phone, a laptop computer, a desktop computer, etc.), hereafter called a shopping optimizer, to select one or more online advertising flyers or catalogs representing one or more stores located within reasonable travel distance of each other, whereby the items for sale are available during a predetermined time period (normally a promotion or sale with limited quantities or limited shopping hours, or both). The shopping optimizer facilitates the selection of desired items from the flyer(s) allowing the user to click them or mark them. The user may also indicate how many of each item he wishes to purchase. This information is captured and stored in a shopping trip file, which can be a relational database, flat file, or any appropriate storage media. The trip file is stored on the user's device and is referenced the day of the sale. In one embodiment, the information in the trip file is also entered into a shared database containing data about other users planning similar shopping trips on this date.

In one embodiment, the user may optionally indicate a priority level for each item. Priority 1 means that the user wishes to buy this item regardless of the sale price, so if more than one store carries it, he would accept a higher price at another of his destinations in the shopping plan. Lower priority (e.g. 2 or 3) means that the user only wants this item if he can get the lowest sale price among the retail destinations in his shopping plan. Therefore, if the item were not available at his chosen store, the optimizer would try to find it among the other stores in his shopping plan or communicate with a service (i.e., a third party or the retailer) in order to suggest a substitute to the shopper.

The shopping optimizer also captures other data from the advertisements and adds it to the shopping trip file. This includes but is not limited to the following:

Address of the store that has a desired item (in one embodiment, this is captured separately using Web maps if it is not found in the advertisement);

Sale hours during which the desired item is available at a special price;

Store opening and closing time for the store that has the desired item;

Percentage Discount (which in one embodiment relates to special discount hours, such as 50% before 1 PM and 30% between 1 PM and 8 PM);

Amount of savings for a desired item (e.g., item regularly sells for $299, but the sale price is $199);

Total quantities of the desired item available per store where multiple stores have the desired item (e.g., only 12 per store); and/or Quantity limits for the desired item per person (e.g., only 2 per person).

In one embodiment, the present invention includes a Global Positioning System (GPS) driving history analyzer component. The GPS driving history component uses past driving history, including timing information, to predict how long it will take the user/shopper to travel from his current location to the next store in the shopping plan. Other available information, such as traffic, weather, road construction, detours, etc., is also used in this calculation. In one embodiment, driving histories of other shoppers are also stored on the user computing device and are entered into the shared database. The GPS analyzer may also compare driving history and timing information of other shoppers (and optionally, the first shopper as well) to predict whether other user(s) will arrive at the store before the first shopper/user.

In one embodiment, a user risk factor is utilized to develop the shopper's itinerary. This user risk factor is a predetermined level set by the shopper, and defines the lowest probability of success that is acceptable to that specific shopper. In this embodiment, success refers to the user arriving at a store before the desired items are gone. This risk factor is used by the shopping optimizer to prioritize the first shopper's route. For example, if a user accepts a 30% minimum probability of success in obtaining a desired item, his plan might include a specific store if there is only a 30% chance that he would arrive in time. But if a user requires at least a 90% probability of success in obtaining the desired item, then that user would not be directed to this store, since the probability that he would arrive in time is less than 90%.

In one embodiment, on the day of a sale, the user indicates the time and date he/she intends to leave the house and whether he/she wishes to maximize the number of items purchased or the total savings for the shopping trip. Using this information, the shopping optimizer will create a shopping plan. The user can also create the plan dynamically as he/she is leaving the house to go shopping.

In one embodiment, on the day of the shopping trip, a real time inventory analyzer periodically interacts with the GPS analyzer (at some predetermined interval) and gathers inventory information pertaining to the shopper's desired items from each store found in the trip file and for each user en route to purchase the same items. The shopping optimizer will assume that users predicted to arrive earlier do, in fact, purchase the desired item(s), and the inventory projections will thus reflect this. The polling interval may be dynamically adjusted if the inventory is being depleted very quickly. The inventory analyzer computes the rate at which the inventory is being sold (e.g., 20 items during the first hour) and will estimate when the supply will be exhausted for each desired item in each store in the trip file using the information about other users en route. If too many other users are predicted to arrive at the store before the first shopper/user, the shopping optimizer dynamically alters the plan and sends this first shopper/user to a different retail location. Likewise, if any en route user changes direction away from the store, the itinerary is updated, based on a new inventory prediction.

Using all of the above information, the shopping optimizer builds a shopping plan with the highest probability of maximizing the number of desired items or the total dollar savings. Included in the analysis are the timing aspects of whether the inventory of desired items is declining fast enough such that the user may not have enough time, based on his/her driving habits and road conditions, to reach the store in time to purchase the desired items. If the probability of reaching the store(s) in time is low, but the user indicates a low minimum probability is acceptable, the optimizer may still include a specific store in his shopping plan. This is repeated each time the user departs from a different destination, e.g., when he is travelling from one store to another.

The user can click on any item in his shopping list and the shopping optimizer will display one or more stores in his shopping plan that feature the item in their sale circular. The user can also optionally display directions to the stores that advertise the item and are in his shopping plan.

Thus, as described herein, the order in which the store visits are planned during the shopping trip favors visiting stores that advertise their high priority item(s), open early, and/or have the least inventory of those items, as long as the time for the user to reach the store is projected to be sooner than the time the inventory is exhausted.

Figure 3:
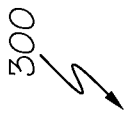
FIG. 3 illustrates an exemplary shopping itinerary generated by the present invention.

With reference now to FIG. 3, an exemplary optimized shopping plan 300 is depicted. Plan 300 is optimized for the highest probability of success in obtaining the most desired items. Since the user is equally near to both Store A and Store B, the probability of successfully purchasing the waffle maker is high, as is the probability of getting a board game. Therefore, Store A is the recommended first stop. The user savings would be $51.00 (($44.99–$14.99)+($24.99–$3.99)=$51.00).

If, however, the user indicates that he wishes to maximize his dollar savings, the first stop will be Store C because the user has an 82% chance of being able to purchase the item at a savings of $150. The expected remaining quantity at arrival takes into account the probability of other users' shopping travels taking them to Store C. In one embodiment, plan 300 in FIG. 3 is used internally by the shopping optimizer to create the shopping route, and is not shown directly to the shopper. In one embodiment, once a user completes the purchase of a desired item, he/she confirms that the inventory adjustment is marked verified, such that the shopping itinerary is updated/modified according to available other desired products, time remaining to shop, etc.

Figure 4:
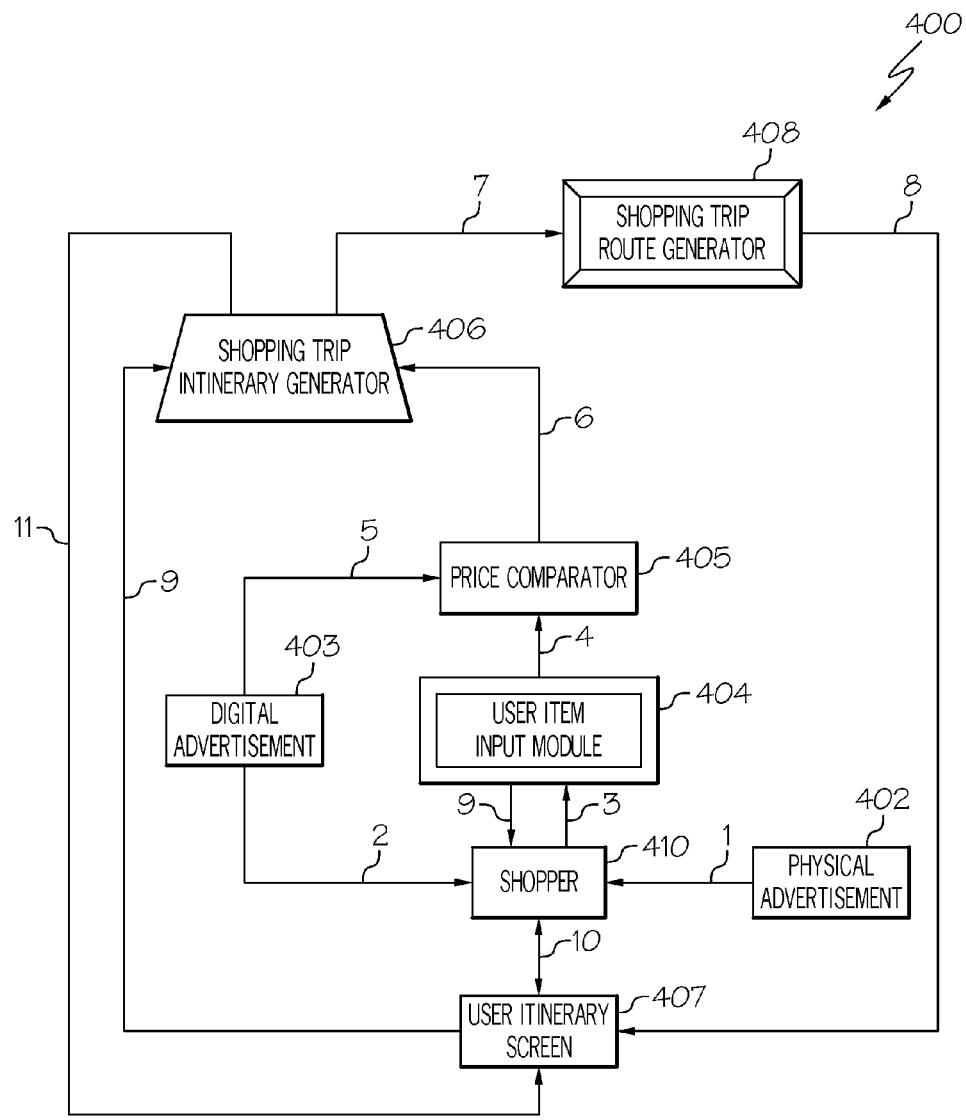
FIG. 4 is a high level flow chart of one or more exemplary steps taken by one or more processors to optimize a shopping excursion.

With reference now to FIG. 4, one embodiment of an exemplary shopping optimizer 400 for optimizing a shopping excursion, in accordance with the present invention, is presented. The components depicted as shopping optimizer 400 comprise a set of hardware and/or software found in computer 102, first user's computer 152, and/or other users' computer(s) 154 depicted in FIG. 1. The depicted physical advertisement 402 is one or more physical advertisements, such as a flyer, mailer, billboard, etc. that advertises one or more products as being for sale. In one embodiment, these products are offered for sale at a special price for a limited time period on a particular day. For example, a limited quantity of a particular product may be offered for sale between the hours of 5:00 AM and 6:00 AM on a single day at a deeply discounted price. In one embodiment, a digital advertisement 403 presents this same information about the particular product for sale at a special time/price. However, digital advertisement 403 is in a digital format, such as an e-mail, a text message, or any other network/computer based message format to a specific group of shoppers.

Thus, physical advertisement 402 introduces one or more shoppers to a sale through, but not limited to, billboards, banners, flyers, magazines, etc. As described for digital advertisement 403, other forms of advertisement are published digitally through the use of, but not limited to, Internet-based direct sales offers, email promotions, text alerts, etc. Thus, physical advertisement 402 and or digital advertisement 403 inform a shopper 410 (e.g., shopper 210 depicted in FIG. 2) of various item(s) and/or sale(s) options, as indicated by steps 1 and/or 2. In order for shopping optimizer 400 to run effectively, the shopper 410 will take into account all the different advertisements when utilizing user item input module 404.

User item input module 404 is hardware/software logic that receives shopping preference information from shopper 410 via step 3. That is, shopper 410 has been made aware of special offers for various goods via steps 1 and/or 2. The shopper 410 (and/or intelligent logic that is able to anticipate what shopper 410 wants and/or needs based on a list of items known to be needed by shopper 410, a shopping history of shopper 410, etc.) decides what advertised items are desired. In various embodiments of the present invention, the shopper's itinerary can be further adjusted according to a maximum risk tolerance for the shopper (i.e., the maximum risk of not getting a desired object that the shopper is willing to tolerate); the minimum price reduction that the shopper is willing to take on a desired object; and/or the maximum distance that the shopper is willing to travel to purchase a desired object.

While the information received from digital advertisement 403 may be textual, in one embodiment it is purely graphical. That is, assume that digital advertisement is merely a drawing or photograph of a particular item. In this embodiment, the shopper 410 will "click" or otherwise indicate her interest in shopping for the depicted item at a physical store. The user item input module 404 receives a copy of the photo that depicts the user-selected item, and then creates a textual descriptor of the item. In one embodiment, this textual descriptor, which will be used to identify store(s) in which the pictured item is located (at a special price), simply comes from metadata that is affixed to the photo file (i.e., a JPEG file). In another embodiment, the textual descriptor is generated by logic within the user item input module 404 recognizing the item through the use of image recognition logic. Once the item is identified by such image recognition logic, it is cross-referenced to a database that contains the identity, location, price, etc. for a particular physical store that has the item for sale and in stock.

In one embodiment, logic within user item input module 404 receives from the user/shopper which items, selected from physical advertisement 402 and/or digital advertisement 403, the shopper 410 has selected to be his/her "desired items", as indicated by step 3. Furthermore, in one embodiment of step 3, the shopper provides the user item input module 404 information about the desired item(s) related to advertised price, store identifications, order of importance to the shopper (i.e., a ranking of how much the shopper wants a first desired item compared to other desired items), a shopping day on which the shopper intends to shop, a starting location of the shopper on the intended shopping day, etc. Once desired items and their known advertised prices are entered into user item input module 404, user item input module 404 then transmits this information to a price comparator 405 (step 4). Price information for this same desired item is pulled from an electronic source (e.g., digital advertisement 403, as indicated by step 5) in order to make a comparison of different prices at different locations.

After the price comparator 405 confirms that the shopper has been presented with the currently best available options, information (e.g., where it is available, how many copies are available, etc.) about the desired item(s) is sent to a shopping trip itinerary generator 406 (step 6). Shopping trip itinerary generator 406 generate an itinerary for a particular shopping date that includes, but is not limited to, store identification(s) of store locations that have the desired item(s); estimated arrival time at a particular store location for the shopper; required arrival time at a particular store location in order to arrive before the desired item(s) sell out; a ranked list of desired items according to their relative importance to the shopper (i.e., determined either by the shopper answering a polling question or based on data mining that reflects that shopper's need for a particular product); an estimated probability that the shopper will be able to purchase one or more desired items on his list, based on available stock and other factors, etc. The shopping trip itinerary generator 406 then sends the generated shopping itinerary to a shopping trip route generator 408, which prepares an optimal travel route (based on the shopper's means of transportation, real-time road and public transportation conditions, etc.) for following the generated shopping trip itinerary (step 7), and returns the route to the user itinerary screen 407 (step 8).

Note that, in one embodiment, the shopping trip itinerary generator 406 also sends a copy of the generated shopping trip itinerary back to the user itinerary screen 407, as indicated by step 9. This allows the shopper to make any desired changes to the itinerary on a user itinerary screen 407 (step 10). The revised itinerary is then sent to the shopping trip itinerary generator 406, as shown in step 11.

Note that the shopping trip itinerary generator 406 and/or the shopping trip route generator 408 provide shopper 410 with stored identifications of stores that have the desired item; any necessary changes throughout shopping trip due to changing travel conditions, store inventory, depleted stock, etc. In one embodiment, the system also alerts the shopper 410 when previously desired items, which were not purchased by the shopper 410 in the past for any reason, go back on sale and/or are replenished/restocked.

Note that in one embodiment, the shopping optimizer 400, either as depicted in FIG. 4 or described elsewhere in the present specification, allows multiple users to shop from the same list. That is, a collaborative window allows multiple users to work together, rather than as adversaries/competitors for a particular product. For example, assume that a first shopper is in a first store and a second shopper (a collaborator of the first shopper) is in a second store. If the first store has a first item that the second shopper desires, and the second store has a second item that the first shopper desires, then the shopping optimizer 400 will enable a first shopper to purchase the first item on behalf of the second shopper, and the second shopper to purchase the second item on behalf of the first shopper.

Note further that, in one embodiment, the shopping optimizer 400 may track the location of other users and dynamically make changes to the shopper's itinerary. These changes are affected by previously mentioned criteria as well as the shopper's probability of success for each desired item. In one embodiment, shopping optimizer 400 takes into account acceptable risk ranges that the shopper is willing to take. For example, if a particular shopper is only willing to accept a 75% chance of purchasing a particular item on a particular shopping day, then shopping optimizer 400 may reroute the shopper to a store location that is farther away than a closer store, provided that the more distant store has more stock and/or fewer expected shoppers for that particular item.

Figure 5:
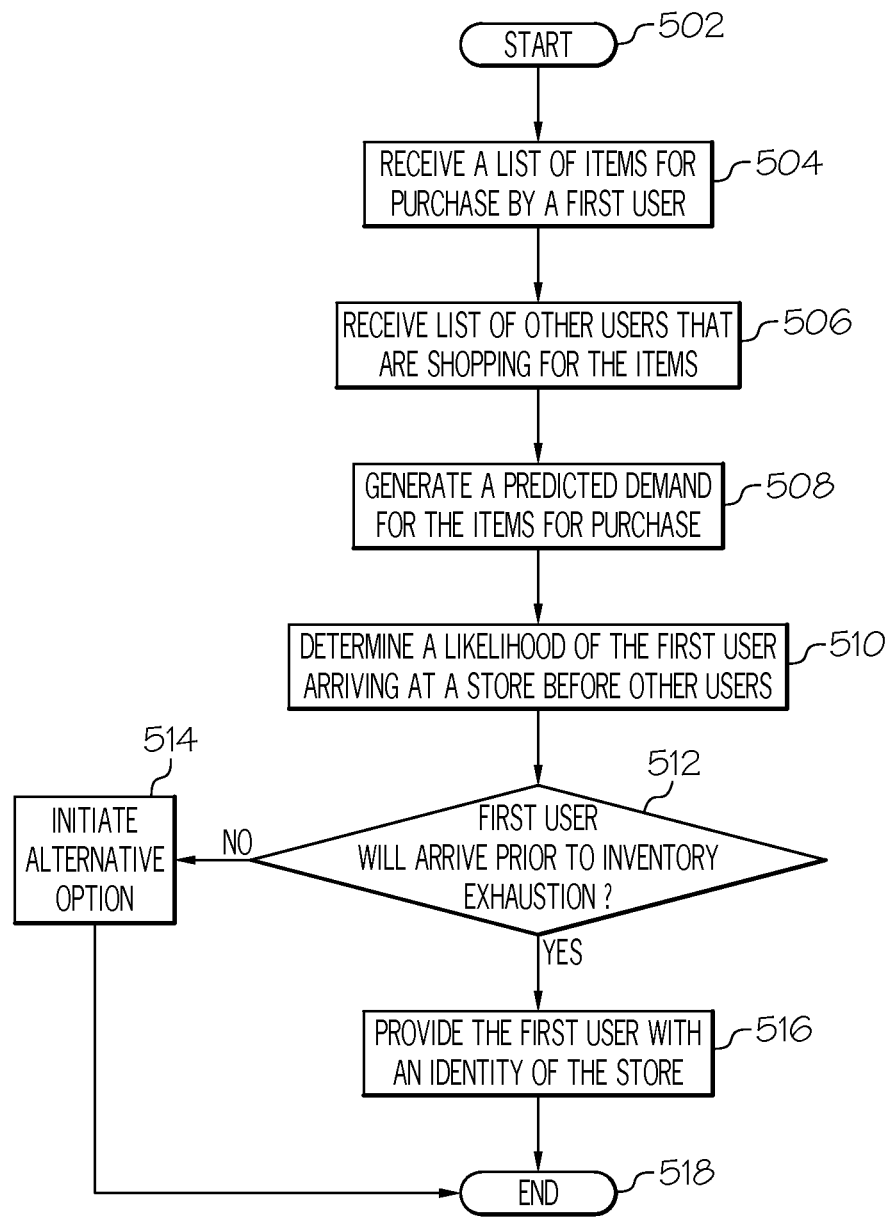
FIG. 5 depicts an exemplary shopping optimizer for optimizing a shopping excursion.

With reference now to FIG. 5, a high level flow chart of one or more exemplary steps taken by one or more processors to optimize shopping for one or more desired items is presented. After initiator block 502, an identification of a desired item is received from a first shopper (block 504), such as shopper 210 shown in FIG. 2. The first shopper may be using a computer such as a first user's computer 152 shown in FIG. 1, and the identification of the desired item may be received by a service providing server, such as computer 102 shown in FIG. 1. The identification of the desired item, which is generated by the first shopper, may be in the form of a list. In one embodiment, the list (of one or more desired items) is generated by the first shopper selecting the desired items from another list of available and/or specially discounted items that are for sale in limited quantities and/or for limited time periods and/or at limited store locations. In one embodiment, the desired item is, at least initially, available for purchase at a first physical store (i.e., a "stick and brick" location, not merely an on-line website).

In one embodiment, the list of desired items are from items that have been described in one or more physical advertisements, such as a flyer, mailer, billboard, etc. that advertises one or more products as being for sale. In one embodiment, these products are offered for sale at a special price for a limited time period on a particular day. For example, a limited quantity of a particular product may be offered for sale between the hours of 5:00 AM and 6:00 AM on a single day (e.g., the day after Thanksgiving—known as "Black Friday" since it is the day that retailers are able to be profitable (i.e., in the "black") for the year) at a deeply discounted price (e.g., at or below the cost to the retailer). In one embodiment, a desired item from a digital advertisement presents this same type of information about the particular desired item/product for sale at a special time/price. However, such digital advertisement is in a digital format, such as an e-mail, a text message, or any other network/computer based message format to a specific group of shoppers.

As described in block 506, an identity of a second shopper is received by the shopping enabling server (e.g., computer 102 shown in FIG. 1). This identified second shopper is another shopper that also desires the desired item, and has been further identified as currently shopping for the desired item. The identity of this second shopper can be derived by several methods.

In one embodiment, the identity of the second shopper is derived by the second shopper also using the shopping optimizer described herein. That is, the second shopper also sends (e.g., from the other user's computer 154 shown in FIG. 1) a list of desired items to the shopping itinerary coordinator (e.g., part of SCOL 148 found in computer 102 in FIG. 1). Thus, SCOL 148 "knows" who the second shopper is, where he is located, what he wants to buy, etc.

In one embodiment, the identity of the second shopper is derived by a shopping history of the second shopper, which may be stored in a database server such as database server 156 shown in FIG. 1. For example, assume that the desired item is advertised at a special price for a specific time on a single date (e.g., "Toaster A" is on sale for the special price of $10.00 only from 5:00 AM to 6:00 AM on the day after Thanksgiving, and only at one or more locations of stores owned by Company A). In this example, the shopping history of the second shopper describes the second shopper's history of purchasing advertised items at a special price at a specific time on a single day.

As described in block 508, a predicted demand for the desired item at a predetermined time is generated. That is, based on how many shoppers are known or estimated to want to purchase the desired item (in one embodiment, at a special discount price) during some predefined period of time (e.g., some particular hour on a certain day, or a particular day during a certain week, or particular week during a certain month, etc.), the demand for that item can be estimated. Thus, this demand is based on the intent indicated by the first shopper and his shopping list of desired items, plus the identities of other shoppers that also want to buy the same item(s) as the first shopper.

As described in block 510, a likelihood of the first shopper arriving at the first physical store before the second shopper purchases a last available instance of the desired item in the first physical store is then determined. This determination is derived 1) from the predicted demand for the desired product at the predefined/predetermined time period, and 2) from relative travel times to the first physical store for the first shopper and the second shopper from an initial point in time. That is, the first shopper and the second shopper are at different geographical locations at the initial point in time, and therefore will have different travel times to reach a certain store that has the desired item in stock at the special price at the special time. In one embodiment, the likelihood of the first shopper arriving before the desired item sells out is further derived by the quantity of the desired item that is available at the first physical store at the initial point in time. That is, if there is only one copy of the desired item in stock at a particular store location, the chance of the first shopper being able to buy it is much less than if there are 100 copies of the desired item at that store location.

As described in query block 512, a determination is made as to whether the first shopper will arrive at the first physical store before the last available instance of the desired item has been purchased by the second shopper (i.e., a determination is made as to whether the store will sell out of the desired item before the first shopper is able to get there). If a determination is made that the first shopper will arrive in time to buy a remaining copy of the desired item, then the user is provided with an identity of the store that has the desired item (block 516). In one embodiment, the identity of the store also includes directions to that store, such that the first shopper's itinerary includes directions to that store. The process ends at termination block 518.

Returning to query block 512, if a determination is made that the second shopper will arrive at the first physical store before the first shopper has a chance to buy the desired object (i.e., the second shopper has already bought the last copy of the desired item), then an alternative option is initiated (block 514). In one embodiment, this alternative option is to direct the first shopper to a second physical store that currently has the desired item in stock.

In one embodiment, the alternative option described in block 514 is to suggest an alternative item to the first shopper. This alternative item has been predetermined by the shopping optimizer to provide the same utility (function), appearance, and/or price as the originally desired item. Thus, if the first shopper arrives at the first physical store after the desired item is out of stock, the shopping optimizer provides an identity and/or location and/or travel directions of and to a second physical store that currently has the alternative item in stock.

In one embodiment of the present invention, the desired item is from a list of multiple desired items for the first shopper. That is, the user has generated a list of multiple desired objects, including objects that have been learned about from sources such as the physical advertisement 402 and/or digital advertisement 403 shown in FIG. 4. In one embodiment, each of the multiple desired items is offered at a discounted price at a different physical store at specific times on a same date. Thus, in such an embodiment a shopping itinerary is generated for the first shopper that directs the first shopper to different physical stores at times during which items on the list are offered at the discounted price.

In one embodiment of the present invention, assume that a determination has been made, by one or more processors executing the SCOL 148 shown in FIG. 1, that the second shopper will arrive at the first physical store before the first shopper. In this scenario, the processor(s) direct the first shopper to a second physical store that currently has the desired item in stock.

In one embodiment of the present invention, the first shopper generates a ranked list of desired items and sends it to the shopping optimizer. This ranked list shows rankings (e.g., the user's determination of how "important" owning a particular item is to her) for various desired items. Assume that the desired item is a highest ranked item on the ranked list of desired items. In this scenario, in response to one or more processors determining that the second shopper will arrive at the first physical store before the first shopper, such that the first shopper is unable to buy the highest-ranked desired object before it sells out, then the shopping optimizer directs the first shopper to a location that has a secondary item in stock. This location may be within the same store that sold out of the highest-ranked desired item, or it may be another store and/or store location. In either embodiment, the secondary item is on the ranked list of desired items, but is ranked lower than the desired item, which is higher/highest ranked.

In one embodiment of the present invention, one or more processors identify an alternative item to the desired item. This alternative item performs a same function as the desired item, but is 1) made by another manufacturer; 2) is higher priced; 3) is a different product but is able to perform the same function (e.g., the desired item is a power saw and the alternative item is a hand saw); etc. In this embodiment, if the first shopper arrives at the first physical store after the desired item is out of stock, then one or more processors (running SCOL 148) provide an identity of and/or location of and/or directions to a second physical store that currently has the alternative item in stock.

In one embodiment of the present invention, one or more processors detect real-time travel route delays to the first physical store that initially has the desired item in stock. These real-time travel route delays can be obtained from a mobile traffic monitoring service, that monitors traffic cameras, etc., to identify real-time traffic delays. If the real-time travel route delays are determined by the processor(s) to cause the first shopper to arrive at the first physical store after the second shopper, then the first shopper is directed to a second physical store that also carries the desired item.

In one embodiment of the present invention, the desired item is advertised at a special price for a specific time on a single date, as described herein. In this embodiment, one or more processors identify who the second shopper is based on a shopping history of the second shopper. This shopping history of the second shopper describes the second shopper's history of purchasing advertised items at a special price at a specific time on a single day. This shopping history is matched up to the particular second shopper, thus identifying who he is. That is, in one embodiment, a particular competition second shopper, who will be shopping for the same items as the first shopper, is personally identified according to his/her past shopping history. In another embodiment, however, the competition second shopper's identity is known, but his/her past shopping history is data mined in order to predict his/her shopping itinerary for a particular day, what items he/she will be interested in, etc.

In one embodiment of the present invention, assume that the desired item was sold out before the first shopper was able to purchase the desired item at the first physical store. In this embodiment of the present invention, if the first physical store subsequently restocks the desired item, then one or more processors transmits an alert to the first shopper. This alert describes a new availability of the desired item at the first physical store.

In one embodiment of the present invention, assume that the desired item is from a list of multiple desired items for the first shopper, and that the multiple desired items are offered at different physical stores. In this embodiment of the present invention, a determination is made by one or more processors that there will be a certain period of time during which crowds at different physical stores will be lightest compared to other periods of times. Using this information, the processors (executing SCOL 148) then generate an itinerary for the first shopper that directs the first shopper to each of the different physical stores during the period of time when the crowds will be lightest compared to the other periods of time.

In one embodiment of the present invention, a determination is made, by one or more processors, of a first probability that the first shopper will arrive at the first physical store before the last available instance of the desired item has been purchased by the second shopper at the first physical store. In this embodiment/scenario, the processors then determine a second probability that the first shopper will arrive at a second physical store before the last available instance of the desired item has been purchased by the second shopper at the second physical store. The processors then, in response to the first probability being lower than a predetermined level set by the first shopper, and in response to the second probability being higher than the predetermined level set by the first shopper, direct the first shopper to the second physical store.

In one embodiment of the present invention, one or more processors determine a probability that the first shopper will arrive at the first physical store before the last available instance/copy of the desired item has been purchased by the second shopper at the first physical store. In this embodiment/scenario, in response to this probability being lower than a predetermined level set by the first shopper, the first shopper is directed to a second physical store.

In one embodiment of the present invention, assume that a third shopper is an agent of the first shopper. That is, a third shopper is shopping on behalf of the first shopper, who is trying to arrive at the first physical store prior to the second shopper before the desired item sells out. In this embodiment, in response to determining that the third shopper has arrived at the first physical store before the second shopper, one or more processors issue authorization from the first shopper to the third shopper to purchase the desired item. Note that this authorization/authority does not exist before the determination is made that the third shopper has arrived at the first physical store before the second shopper.

In one embodiment of the present invention, the desired item is advertised to a specific geographic region (e.g., through flyers and/or mailers to a certain zip code, through e-mails to Internet Protocol (IP) addresses known to be supported by an Internet Service Provider (ISP) in a certain city, etc.). In this embodiment, one or more processors determines/calculates how many shoppers (an estimated quantity of shoppers) within that specific geographic region will be shopping for copies of the desired item at a particular time. Using this information, the processors adjust the (estimated) likelihood of the first shopper arriving at the first physical store before the last available instance of the desired item in the first physical store is purchased based on the estimated quantity of shoppers within the specific geographic region who will be shopping for copies of the desired item at the particular time.

In one embodiment of the present invention, assume that a first shopper desires a first item and a second item, but that the first shopper ranks the first item over the second item in importance to the first shopper. Assume also that a second shopper also desires the first item and the second item, but the second shopper ranks the second item over the first item in importance to the second shopper. In this scenario and embodiment, one or more processors (executing SCOL 148), in response to determining that the first shopper has access to the second item and that the second shopper has access to the first item, direct the first shopper to purchase the second item on behalf of the second shopper and the second shopper to purchase the first item on behalf of the first shopper.

In one embodiment of the present invention, assume that the shopper has arrived at the first physical store that has the desired item in stock. However, assume further that the item may be difficult to locate, because the store and/or the crowd are large. In this embodiment, one or more processors (executing SCOL 148) provide the shopper with directions to a specific location (i.e., a specific aisle) within the first physical store where the desired item is located.

In one embodiment of the present invention, assume that one or more processors has determined that the desired item has sold out at the first physical store without the first shopper purchasing an instance of the desired item. For example, the processors may monitor the identities of all shoppers who were successful in buying the desired item before it sold out. If the first shopper's identity does not appear as one of the successful shoppers, then that first shopper is sent a message, telling the first shopper when the desired item will next be in stock at the first physical store.

As described herein, the present invention provides a process/system/method that enables a shopper to review one or more on line store advertising flyers prior to a sale and select (mark) items he/she would like to purchase. The shopping optimizer can then plan an optimized shopping trip with recommended arrival times at one or more of the stores. This plan is updated dynamically during the day of the sale to maximize the total number and quantity of desired items that can be purchased before supplies run out or alternately to optimize the dollar savings for purchasing the desired items before supplies are exhausted.

The present invention enables tracking the rate of declining inventory of the user's selected items, and predicting item availability, given his current GPS location and the GPS locations of other shoppers headed to the same stores. This is accomplished by computing the probability that the user can arrive at a store(s) to purchase one or more of these items before the supply are exhausted. Additionally, this invention gives the retailer an opportunity to suggest a substitute item if the supply of a user selected item is, or will be exhausted when he/she arrives at the store. The probability that a chosen item is available is matched to a user supplied risk tolerance level to determine how best to optimize the overall shopping plan for this user in concert with the other users en route and competing for the same items. Once a user purchases a desired item he/she can confirm that the inventory adjustment is verified.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer program product for optimizing a shopping itinerary, the computer program product comprising a non-transitory computer readable storage medium having program code embodied therewith, the program code readable and executable by one or more processors to perform a method comprising:

receiving, by the one or more processors, from a computing device of a first shopper, over a network, an identification of a first desired item, wherein the identification of the first desired item is from a list of multiple desired items for the first shopper, wherein each desired item of the multiple desired items is offered at a discounted price, at a different physical store, and at a specific time on a given date, and wherein the first desired item is available for purchase at a first physical store at a first specific time on a first given date comprising a point in time of the receiving from the computing device of the first shopper, the identification of the first desired item;

receiving, by the one or more processors, from a computing device of a second shopper, over the network, an identity of the second shopper, wherein the second shopper has been identified as also desiring the first desired item and currently shopping for the first desired item;

determining a likelihood of the first shopper arriving at the first physical store before the second shopper purchases a last available instance of the first desired item in the first physical store, wherein the determining comprises:

ascertaining, by the one or more processors, a geographical location of the first shopper at the point in time of the receiving from the computing device of the first shopper, the identification of the first desired item, based on utilizing a global positioning system in the computing device of the first shopper over the network;

ascertaining, by the one or more processors, a geographical location of the second shopper at the point in time of the receiving from the computing device of the first shopper, the identification of the first desired item, based on utilizing a global positioning system in the computing device of the second shopper over the network;
determining, by the one or more processors, relative travel times to the first physical store for the first shopper and the second shopper from the point in time of the receiving from the computing device of the first shopper, the identification of the first desired item;
determining, by the one or more processors, a time at which a quantity of the first desired items will be exhausted, based on polling, at pre-determined intervals, an inventory management system to determine the quantity of the first desired items that is available at the first physical store and a rate at which the first desired item is sold at the first physical store during the pre-determined intervals; and
determining, by the one or more processors, the likelihood of the first shopper arriving at the first physical store before the second shopper purchases the last available instance of the first desired item in the first physical store, by comparing the time at which the quantity of the first desired items will be exhausted with the relative travel times;
based on the likelihood, determining, by the or more processors, that the first shopper will arrive at the first physical store before the last available instance of the first desired item has been purchased by the second shopper;
computing, by the one or more processors, directions to the first physical store from the geographical location of the first shopper, wherein based on following the direction, the first shopper will arrive at the first physical store at a time before the time at which the quantity of the first desired items will be exhausted;
providing, by the one or more processors, over the network, the first shopper with an identity of the first physical store, wherein the providing comprises providing the global positioning system in the computing device of the first shopper with directions to the first physical store to enable the computing device of the first shopper to navigate to the first physical store to arrive before the time at which the quantity of the first desired items will be exhausted; and
generating, by the one or more processors, a shopping itinerary for the first shopper, wherein the shopping itinerary comprises, for the first desired item, the identity of the first physical store and the directions to the first physical store and for each remaining desired item on the list of multiple desired items, an identity of the different physical store and directions to the different physical store with an anticipated arrival at the specific time on a given date when the desired item is offered at the discounted price.

2. A computer system comprising:
computer readable memory;
one or more processors in communication with the computer readable memory; and
program instructions executable by the one or more processors via the memory to perform a method, the method comprising:
receiving, by the one or more processors, from a computing device of a first shopper, over a network, an identification of a first desired item, wherein the identification of the first desired item is from a list of multiple desired items for the first shopper, wherein each desired item of the multiple desired items is offered at a discounted price, at a different physical store, and at a specific time on a given date, and wherein the first desired item is available for purchase at a first physical store at a first specific time on a first given date comprising a point in time of the receiving from the computing device of the first shopper, the identification of the first desired item;
receiving, by the one or more processors, from a computing device of a second shopper, over the network an identity of the second shopper, wherein the second shopper has been identified as also desiring the first desired item and currently shopping for the first desired item;
determining, by the one or more processors, a likelihood of the first shopper arriving at a first physical store before the second shopper purchases a last available instance of the first desired item in the first physical store, the determining comprising:
ascertaining, by the one or more processors, a geographical location of the first shopper at the point in time of the receiving from the computing device of the first shopper, the identification of the first desired item, based on utilizing a global positioning system in the computing device of the first shopper over the network;
ascertaining, by the one or more processors, a geographical location of the second shopper at the point in time of the receiving from the computing device of the first shopper, the identification of the first desired item, based on utilizing a global positioning system in the computing device of the second shopper over the network;
determining, by the one or more processors, relative travel times to the first physical store for the first shopper and the second shopper from the point in time of the receiving from the computing device of the first shopper, the identification of the first desired item;
determining, by the one or more processors, a time at which a quantity of the first desired items will be exhausted, based on polling, at pre-determined intervals, an inventory management system to determine the quantity of the first desired items that is available at the first physical store and a rate at which the first desired item is sold at the first physical store during the pre-determined intervals; and
determining, by the one or more processors, the likelihood of the first shopper arriving at the first physical store before the second shopper purchases the last available instance of the first desired item in the first physical store, by comparing the time at which the quantity of the first desired items will be exhausted with the relative travel times;
based on the likelihood, determining, by the or more processors, that the first shopper will arrive at the first physical store before the last available instance of the first desired item has been purchased by the second shopper;
computing, by the one or more processors, directions to the first physical store from the geographical location of the first shopper, wherein based on following the direction, the first shopper will arrive at the first physical store at a time before the time at which the quantity of the first desired items will be exhausted; and providing, by the one or more processors, over the network, the first shopper with an identity of the first physical store, wherein the providing comprises providing the global positioning system in the computing device of the first shopper with directions to the first physical store to enable the computing device of the first shopper to navigate to the first physical store to arrive before the time at which the quantity of the first desired items will be exhausted; and generating, by the one or more processors, a shopping itinerary for the first shopper, wherein the shopping itinerary comprises, for the first desired item, the identity of the first physical store and the directions to the first physical store and for each remaining desired item on the list of multiple desired items, an identity of the different physical store and directions to the different physical store with an anticipated arrival at the specific time on a given date when the desired item is offered at the discounted price.

3. The computer program product of claim 1, wherein the method further comprises:

receiving, by the one or more processors, from the computing device of the first shopper, over the network, an identification of a second desired item, wherein the identification of the second desired item is generated by the first shopper, and wherein the second desired item is available for purchase at a second physical store at a point in time of the receiving from the computing device of the first shopper, the identification of the second desired item;

receiving, by the one or more processors, from a computing device of a second shopper, over the network, an identity of the second shopper, wherein the second shopper has been identified as also desiring the second desired item and currently shopping for the second desired item;

determining a likelihood of the first shopper arriving at the second physical store before the second shopper purchases a last available instance of the second desired item in the second physical store, wherein said determining comprises:

ascertaining, by the one or more processors, a geographical location of the first shopper at the point in time of the receiving from the computing device of the first shopper, the identification of the second desired item, based on utilizing a global positioning system in the computing device of the first shopper over the network;

ascertaining, by the one or more processors, a geographical location of the second shopper at the point in time of the receiving from the computing device of the first shopper, the identification of the second desired item, based on utilizing a global positioning system in the computing device of the second shopper over the network;

determining, by the one or more processors, relative travel times to the second physical store for the first shopper and the second shopper from the point in time of the receiving from the computing device of the first shopper, the identification of the second desired item;

determining, by the one or more processors, a time at which the quantity of the second desired items will be exhausted, based on polling, at pre-determined intervals, an inventory management system comprising inventory data of the second physical store to determine a quantity of the second desired items that is available at the second physical store and a rate at which the second desired item is sold at the second physical store during the pre-determined intervals; and determining, by the one or more processors, the likelihood of the first shopper arriving at the second physical store before the second shopper purchases the last available instance of the second desired item in the second physical store, by comparing the time at which the quantity of the second desired items will be exhausted with the relative travel times;

based on the likelihood, determining, by the or more processors, that the first shopper will arrive at the second physical store after the last available instance of the second desired item has been purchased by the second shopper;

computing, by the one or more processors, directions to a third physical store from the geographical location of the first shopper, wherein the third physical location currently has the second desired item in stock.

4. The computer program product of claim 3, wherein the method further comprises:

receiving a ranked list of desired items from the first shopper, wherein the second desired item is a highest ranked item on the ranked list of desired items; and directing the first shopper to a location that has a secondary item in stock, wherein the secondary item is on the ranked list of desired items, and wherein the secondary item is ranked lower than the second desired item.

5. The computer program product of claim 3, wherein the method further comprises:

identifying an alternative item to the second desired item based on a functionality of the desired item being equivalent to a functionality of the alternative item; and providing an identity of a fourth physical store that currently has the alternative item in stock.

6. The computer program product of claim 3, wherein determining, by the one or more processors, relative travel times to the second physical store for the first shopper and the second shopper from the point in time of the receiving from the computing device of the first shopper, the identification of the second desired item, further comprises:

detecting real-time travel route delays to the second physical store.

7. The computer program product of claim 1, the method further comprises:

identifying the second shopper based on obtaining by the one or more processors, a shopping history of the second shopper, wherein the shopping history of the second shopper describes the second shopper's history of purchasing the first desired item at a discounted price equivalent to a price of the first item at the point in time of the receiving from the computing device of the first shopper, the identification of the first desired item.

8. The computer program product of claim 1, wherein the desired item was sold out before the first shopper was able to purchase the desired item at the first physical store, and wherein the method further comprises:

in response to the first physical store restocking the desired item, transmitting an alert to the first shopper, wherein the alert describes a new availability of the desired item at the first physical store.

9. The computer program product of claim 1, wherein generating the shopping itinerary for the first shopper further comprises:

determining, by the one or more processors, for each physical location, a period of time during the specific time on the given date during which crowds at each different physical stores will be lightest compared to other periods of times during the specific time on the given date; and generating the shopping itinerary for the first shopper, wherein the shopping itinerary directs the first shopper to each of the different physical stores during the period of time when the crowds will be lightest compared to the other periods of time.

10. The computer program product of claim 3, wherein determining the likelihood of the first shopper arriving at the second physical store before the second shopper purchases the last available instance of the second desired item in the second physical store further comprises:

determining a first probability that the first shopper will arrive at the second physical store before said last available instance of the second desired item has been purchased by the second shopper at the second physical store;

determining a second probability that the first shopper will arrive at a third physical store before said last available instance of the second desired item has been purchased by the second shopper at the third physical store; and in response to the first probability being lower than a predetermined level set by the first shopper, and in response to the second probability being higher than the predetermined level set by the first shopper, determining the likelihood that the first shopper will arrive at the second physical store after the last available instance of the second desired item has been purchased by the second shopper and directing the first shopper to the second physical store.

11. The computer program product of claim 3, wherein determining the likelihood of the first shopper arriving at the second physical store before the second shopper purchases a last available instance of the second desired item in the second physical store, further comprises:

obtaining, by the one or more processors, based on receiving an input from the computing device of the first shopper, a predetermined likelihood level;

determining the likelihood that the first shopper will arrive at the second physical store before said last available instance of the second desired item has been purchased by the second shopper at the second physical store lower than the predetermined likelihood level; and directing the first shopper to a the third physical store.

12. The computer program product of claim 3, wherein the second desired item is a highest ranked item from a ranked list of multiple desired items for the first shopper, and wherein the method further comprises:

directing the first shopper to a physical location of a lower ranked item from the ranked list of multiple desired items for the first shopper.

13. The computer program product of claim 1, wherein a third shopper is an agent of the first shopper, and wherein the method further comprises:

in response to determining that the third shopper has arrived at the first physical store before the second shopper, issuing authorization from the first shopper to the third shopper to purchase the desired item.

14. The computer program product of claim 1, wherein the desired item is advertised to a specific geographic region, and wherein the method further comprises:

determining an estimated quantity of shoppers within the specific geographic region who will be shopping for copies of the desired item at a particular time; and adjusting the likelihood of the first shopper arriving at the first physical store before the last available instance of the desired item in the first physical store is purchased based on the estimated quantity of shoppers within the specific geographic region who will be shopping for copies of the desired item at the particular time.

15. The computer program product of claim 1, wherein the first shopper desires a first item and a second item, wherein the first shopper ranks the first item over the second item in importance to the first shopper, and wherein the second shopper also desires the first item and the second item, but wherein the second shopper ranks the second item over the first item in importance to the second shopper, and wherein the method further comprises:

in response to determining that the first shopper has access to the second item and that the second shopper has access to the first item, directing the first shopper to purchase the second item on behalf of the second shopper and the second shopper to purchase the first item on behalf of the first shopper.

16. The computer program product of claim 1, wherein the method further comprises:

directing the first shopper to a specific location within the first physical store where the desired item is located.

17. The computer program product of claim 1, wherein the method further comprises:

in response to determining that the desired item has sold out at the first physical store without the first shopper purchasing an instance of the desired item, transmitting a notice to the first shopper of when the desired item will next be in stock at the first physical store.

18. The computer program product of claim 1, wherein the method further comprises:

receiving a pictorial representation of the desired item from the first shopper; and creating the identification of the desired item from the pictorial representation of the desired item.

\* \* \* \* \*